Oct. 24, 1933.  W. W. JONES  1,931,659
OPTICAL TESTING DEVICE
Filed June 3, 1931
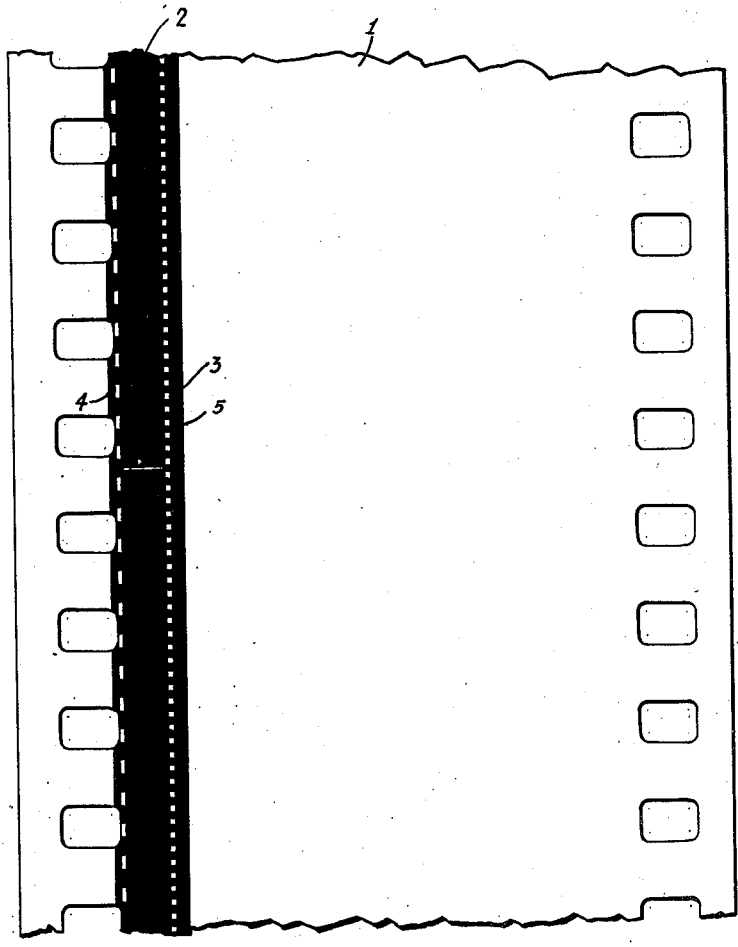
INVENTOR
WILLIAM W. JONES
BY H. S. Snover
ATTORNEY Patented Oct. 24, 1933

1,931,659

UNITED STATES PATENT OFFICE 1,931,659

OPTICAL TESTING DEVICE

William Watkin Jones, Yonkers, N. Y., assignor to Radio Corporation of America, a corporation of Delaware Application June 3, 1931. Serial No. 541,747

5 Claims. (Cl. 88—14)

My invention relates to optical testing apparatus, and more particularly to apparatus for testing optical systems for focus and alignment after they have been set up in predetermined relation to other apparatus.

One object of the invention is to provide a device for testing the focus and alignment of optical systems in photo-electric sound reproducers.

Another object is to provide a test film which can be run through a conventional "talking-movie" apparatus and which will, from the sounds produced, indicate whether the optical system thereof is in proper working order as to focus, alignment, etc.

Another object is to provide such a test film which will indicate the exact condition of the apparatus regardless of the care used by the operator in the application of the test or the adjustment of the apparatus.

Another object is to provide a means for a person of limited optical experience to readily determine to a high degree of accuracy the focus and alignment of an optical system, which obviously would otherwise require much time and expensive apparatus.

The invention involves a sound-record on a film, preferably of the variable-area type, which is so constructed that if the optical system is in perfectly accurate adjustment no sound is produced, but if the system is out of adjustment, either as to focus or alignment, a sound will be produced which will indicate the specific fault both qualitatively and quantitatively.

The figure of drawing illustrates the preferred form of the invention, wherein,—"1" indicates a conventional motion-picture film carrying a sound-track thereon; "2" indicates the sound-track which is sufficiently wider than that usually provided for the specific apparatus to be tested to permit the inclusion of applicant's invention thereon; "3" indicates a sound-track or, as I prefer to term it, a "buzz-track", which is preferably of the specific form indicated in the drawing and spaced a predetermined distance from the desired limits of focus of the optical system; "4" indicates a second buzz-track, preferably of different characteristics as shown, spaced a corresponding distance on the opposite side of the limits of the focus; and "5" indicates the image of a light slit or any other equivalent primary or secondary light-source which is adapted to reproduce sound from or record sound upon the type of film described above in the manner usual in such apparatus.

It will be apparent to those skilled in the art that the image 5 may be within certain limits of tolerance as to both focus and alignment, and it will be further apparent that the film 1 may have a certain amount of "weave" therein, but the summation of these factors rather than their individual values is important.

I accordingly provide, on one side of the sound-track, the buzz-track 3 which is separated a predetermined distance from the desired image 5; and at the same distance on the other side of the image 5 the buzz-track 4. If the image is so badly out of focus that it will not be satisfactory in operation, or, in other words, if it is not as sharp as indicated at 5, some of the light will pass through the track 3, or through the track 4, or both, and a sound will be produced. Both the quantity and the quality of this sound will obviously be dependent upon the lack of sharpness of the image.

Even if the image is in sharp focus, it may be out of alignment with the sound-track, and in this case a sound is also produced. If the image is out of alignment to the right a high-pitched sound is produced, and if the image is out of alignment to the left a lower-pitched sound is produced.

If there is any mechanical fault in the apparatus and the film in consequence weaves from one side to the other, there will obviously be produced alternately a high-pitched sound and a low-pitched sound; but it will also be obvious that this invention is not limited to such different sounds.

For example, a blank darkened portion may be used for the middle of the sound-track and the two marginal tracks may be identical and, instead of being composed of rectangular areas of different size and spacing, these two marginal areas may be merely comparatively clear areas, the sound therefrom being the usual "ground-noise" or noise due to individual silver grains, scratches on the film, etc.

It is likewise within the scope of the invention to provide a clear middle portion for the sound-track with margins therefor differing in any desired respect therefrom or to provide a dark middle portion with the margins differing as above disclosed or in any other desired respect therefrom.

I may also provide the rectangular apertures of the type shown but spaced by a distance less than the length of the image, and in this case the apertures should be staggered and the space therebetween should be equal to the length of the apertures. It will be apparent that in this form if the system is in proper alignment, the light passing through each series of apertures will be the same and the two series of impulses will be opposite in phase wherefore no sound will be produced; but if there is any deviation from proper alignment a greater quantity of light will be passed through one series of apertures than through the other and a sound will be produced which will be proportional to the misalignment.

I may further substitute for such series of staggered apertures or transparent areas any other form of opposed light transmitting or light obstructing sound tracks optically balanced about the center of alignment of the optical system; such, for example, as opposed sine curves in opposite phase, saw-tooth lines, or the equivalent.

I claim:

1. An optical testing device comprising a film rendered opaque over the portion normally occupied by the sound record, and sound tracks on said film on each side of the said opaque portion, whereby sound will be reproduced from said film only when the film and optical system of a sound reproducing apparatus are displaced from the normal relation to each other.

2. Apparatus for determining the focus and alignment of the optical system of a sound reproducing apparatus comprising a film having a blank space over the regions occupied normally by the sound record on the sound track and having different sound records immediately adjacent to the said portion of each side, whereby any variation in position of either the sound track or the optical system may be readily detected.

3. A test film comprising an area to be aligned with a sound reproducing optical system, and sound tracks laterally adjacent to said area whereby sound reproduction will be caused by misalignment.

4. An optical testing device comprising a film rendered opaque over the portion normally occupied by the sound record and sound tracks of different constant frequencies on said film on each side of the said opaque portion, whereby sound will be reproduced from said film only when the film and optical system of a sound reproducing apparatus are displaced from the normal relation to each other.

5. Apparatus for determining the focus and alignment of the optical system of a sound reproducing apparatus comprising a film having a blank space over the regions occupied normally by the sound record on the sound track and having different constant frequency sound records immediately adjacent to the said portion of each side, whereby any variation in position of either the sound track or the optical system may be readily detected.

WILLIAM WATKIN JONES.